(12) United States Patent
Haran et al.

(10) Patent No.: US 11,435,859 B2
(45) Date of Patent: Sep. 6, 2022

(54) DRIVING SIGNALS FOR CAPACITIVE TOUCH-SENSITIVE SURFACE

(71) Applicant: Microsoft Technology Licensing, LLC, Redmond, WA (US)

(72) Inventors: On Haran, Kfar Saba (IL); Gilad Pundak, Rehovot (IL); Amir Zyskind, Tel Aviv (IL); Jonathan Westhues, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/165,773

(22) Filed: Feb. 2, 2021

(65) Prior Publication Data

US 2022/0137745 A1     May 5, 2022

Related U.S. Application Data

(60) Provisional application No. 63/108,534, filed on Nov. 2, 2020.

(51) Int. Cl.
 *G06F 3/044* (2006.01)
(52) U.S. Cl.
 CPC .......... *G06F 3/0441* (2019.05); *G06F 3/0446* (2019.05); *G06F 3/0447* (2019.05)
(58) Field of Classification Search
 CPC ..... G06F 3/0441; G06F 3/0446; G06F 3/0447
 See application file for complete search history.

(56) References Cited

U.S. PATENT DOCUMENTS 5,905,489 A * 5/1999 Takahama ............. G06F 3/0412
                                                     345/174
8,232,977 B2   7/2012 Zachut et al.
(Continued)

FOREIGN PATENT DOCUMENTS

WO       2019070464 A1     4/2019

OTHER PUBLICATIONS

Lee, et al., "Mutual Capacitive Sensing Touch Screen Controller for Ultrathin Display with Extended Signal Passband Using Negative Capacitance", In Journal of Sensors, vol. 18, Issue 11, Oct. 26, 2018, pp. 1-13.

(Continued)

*Primary Examiner* — Amit Chatly
(74) *Attorney, Agent, or Firm* — Alleman Hall Creasman & Tuttle LLP

(57) ABSTRACT

A touch-sensitive device, including a capacitive touch-sensitive surface including an array of electrodes. The touch-sensitive device may further include processing circuitry configured to determine a detected position at which a stylus contacts or hovers above the capacitive touch-sensitive surface. The processing circuitry may determine, based at least in part on the detected position, a first and second electrode set of the electrodes included in the array. The detected position may be located proximate to one or more first row electrodes and/or one or more first column electrodes included in the first electrode set. The second electrode set may include a plurality of second row electrodes and a plurality of second column electrodes not included in the first electrode set. The touch-sensitive device may further include a driving circuit configured to transmit a first driving signal to the first electrode set and a second driving signal to the second electrode set.

15 Claims, 17 Drawing Sheets

(56) References Cited

U.S. PATENT DOCUMENTS

| | | |
|---|---|---|
| 8,780,065 B2 | 7/2014 | Ribeiro et al. |
| 9,041,682 B2 | 5/2015 | Philipp et al. |
| 9,158,418 B2 | 10/2015 | Oda et al. |
| 9,218,089 B2 | 12/2015 | Yamaguchi et al. |
| 9,552,115 B2 | 1/2017 | Hotelling et al. |
| 9,619,073 B2 | 4/2017 | Shin et al. |
| 9,639,217 B2 | 5/2017 | Zhitomirskiy |
| 9,753,586 B2 | 9/2017 | Marino et al. |
| 10,042,472 B2 | 8/2018 | Hotelling et al. |
| 10,310,687 B2 | 6/2019 | Maharyta |
| 2006/0012581 A1 | 1/2006 | Haim et al. |
| 2011/0080353 A1 | 4/2011 | Kang et al. |
| 2014/0313146 A1* | 10/2014 | Munechika ......... G06F 3/04166 345/173 |
| 2016/0062519 A1* | 3/2016 | Park ..................... G09G 5/003 345/173 |
| 2016/0202784 A1* | 7/2016 | Bell ..................... G06F 3/0446 345/173 |
| 2019/0179446 A1 | 6/2019 | Kremin et al. |
| 2019/0179475 A1 | 6/2019 | Seo et al. |
| 2020/0241720 A1 | 7/2020 | Liang |

OTHER PUBLICATIONS

"International Search Report and Written Opinion Issued in PCT Application No. PCT/US21/048322", dated Dec. 23, 2021, 10 Pages.

* cited by examiner

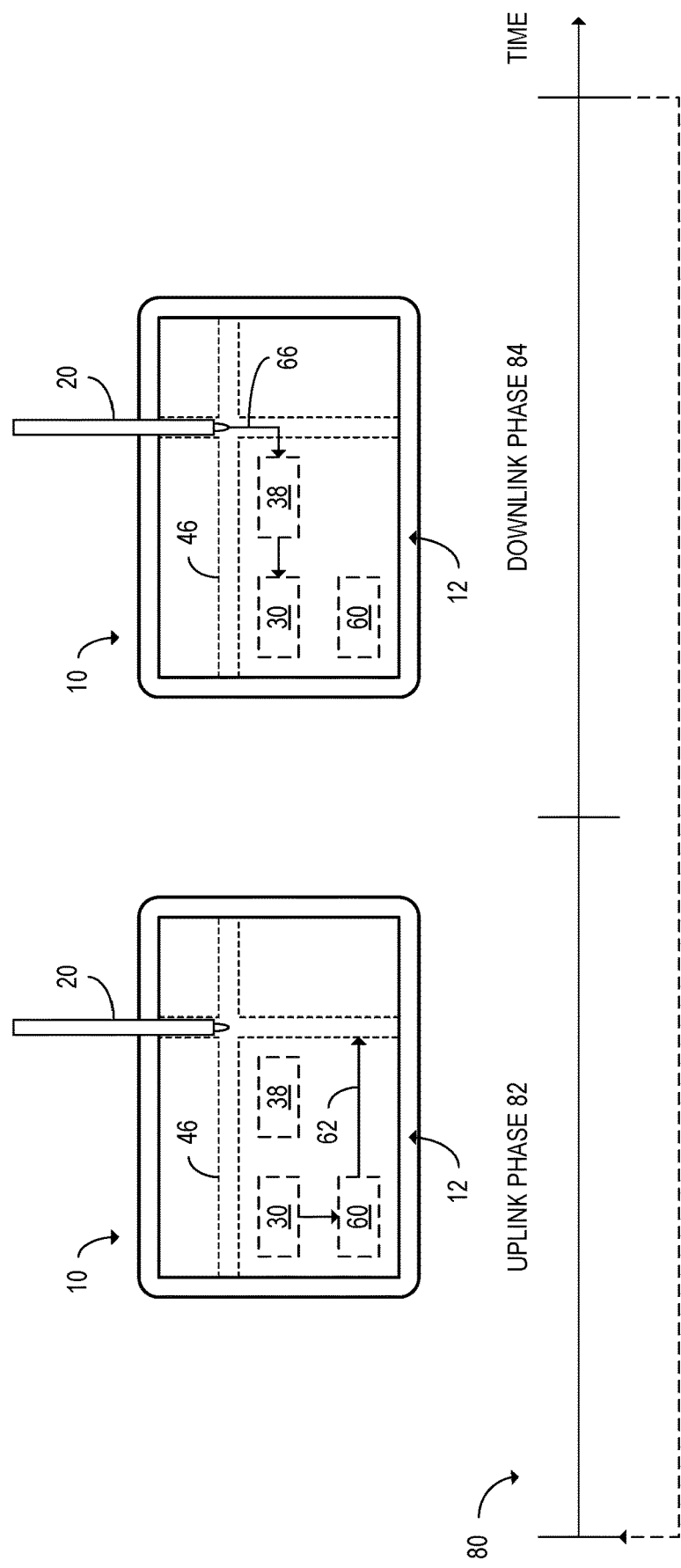

DRIVING SIGNALS FOR CAPACITIVE TOUCH-SENSITIVE SURFACE

CROSS REFERENCE TO RELATED APPLICATIONS

This application claims priority to U.S. Provisional Patent Application Ser. No. 63/108,534, filed Nov. 2, 2020, the entirety of which is hereby incorporated herein by reference for all purposes.

BACKGROUND

Capacitive touch sensors are frequently included in computing devices such as smartphones, tablets, and laptop computers. At a capacitive touch sensor, objects that are contacting the sensor or hovering near the sensor may be detected by measuring changes in capacitance at the surface of the sensor. For example, the object may be a stylus or a user's finger. In order to measure the capacitance of the surface, a voltage is applied to the surface of the capacitive touch sensor. The capacitance may, for example, be measured by detecting a frequency of an oscillator included in a sensor circuit, or by measuring a capacitance ratio between the surface and another capacitor when an alternating current is applied to the sensor circuit.

SUMMARY

According to one aspect of the present disclosure, a touch-sensitive device is provided, including a capacitive touch-sensitive surface including an array of electrodes arranged in a plurality of rows and a plurality of columns. The touch-sensitive device may further include processing circuitry configured to determine a detected position at which a stylus contacts or hovers above the capacitive touch-sensitive surface. The processing circuitry may be further configured to determine, based at least in part on the detected position, a first electrode set and a second electrode set of the electrodes included in the array. The detected position may be located proximate to one or more first row electrodes and/or one or more first column electrodes included in the first electrode set. The second electrode set may include a plurality of second row electrodes and a plurality of second column electrodes not included in the first electrode set. The touch-sensitive device may further include a driving circuit configured to transmit a first driving signal to the first electrode set and transmit a second driving signal that differs from the first driving signal to the second electrode set.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 schematically shows a phase cycle including an uplink phase and a downlink phase, according to the configuration of FIG. 1.

DETAILED DESCRIPTION

Capacitive touch sensors are typically configured to have driving electrodes arranged along the rows and columns of a grid such that each driving electrode corresponds to a row or a column. When voltage is supplied to the electrodes, capacitance measurements may be made at intersection points between the rows and columns associated with the electrodes. From these capacitance measurements, one or more touch positions on the surface of the capacitive touch sensor may be determined.

Capacitive touch sensors may be used with active styluses that have onboard processing capabilities. When such a stylus is used, the stylus may receive an input signal from the capacitive touch sensor. Thus, in order to provide high signal fidelity to the stylus, it may be desirable to provide a high voltage at the surface of the capacitive touch sensor.

In some existing capacitive touch sensors, a voltage signal may be supplied to all the driving electrodes concurrently. However, when the electrodes included in existing capacitive touch sensors are all driven concurrently, voltages may be induced on other components of the capacitive touch sensor. In addition, voltages may be induced on other components included in a device in which the capacitive touch sensor is included. For example, when the capacitive touch sensor is a touch-sensitive display that also includes components with which images may be displayed, graphical artifacts may occur on the touch-sensitive display as a result of the induced voltages.

Alternatively, a voltage signal may be applied to a first predetermined half of the electrodes while an opposite voltage signal is applied to the other half of the electrodes. For example, a voltage signal may be applied to the row electrodes while another voltage signal with the same magnitude but an opposite sign may be applied to the column electrodes. Each of these voltage signals may be an alternating current (AC) signal or a direct current (DC) signal. By driving half of the electrodes with the opposite voltage signal, charges induced on other components of the device may cancel out, which may prevent graphical artifacts from occurring. Although induced voltages may be mitigated by driving a first predetermined half of the electrodes with a voltage signal and the other predetermined half of the electrodes with the opposite voltage signal, such configurations may require a stylus used with the capacitive touch sensor to have a more complex configuration of electronic components.

Figure 1:
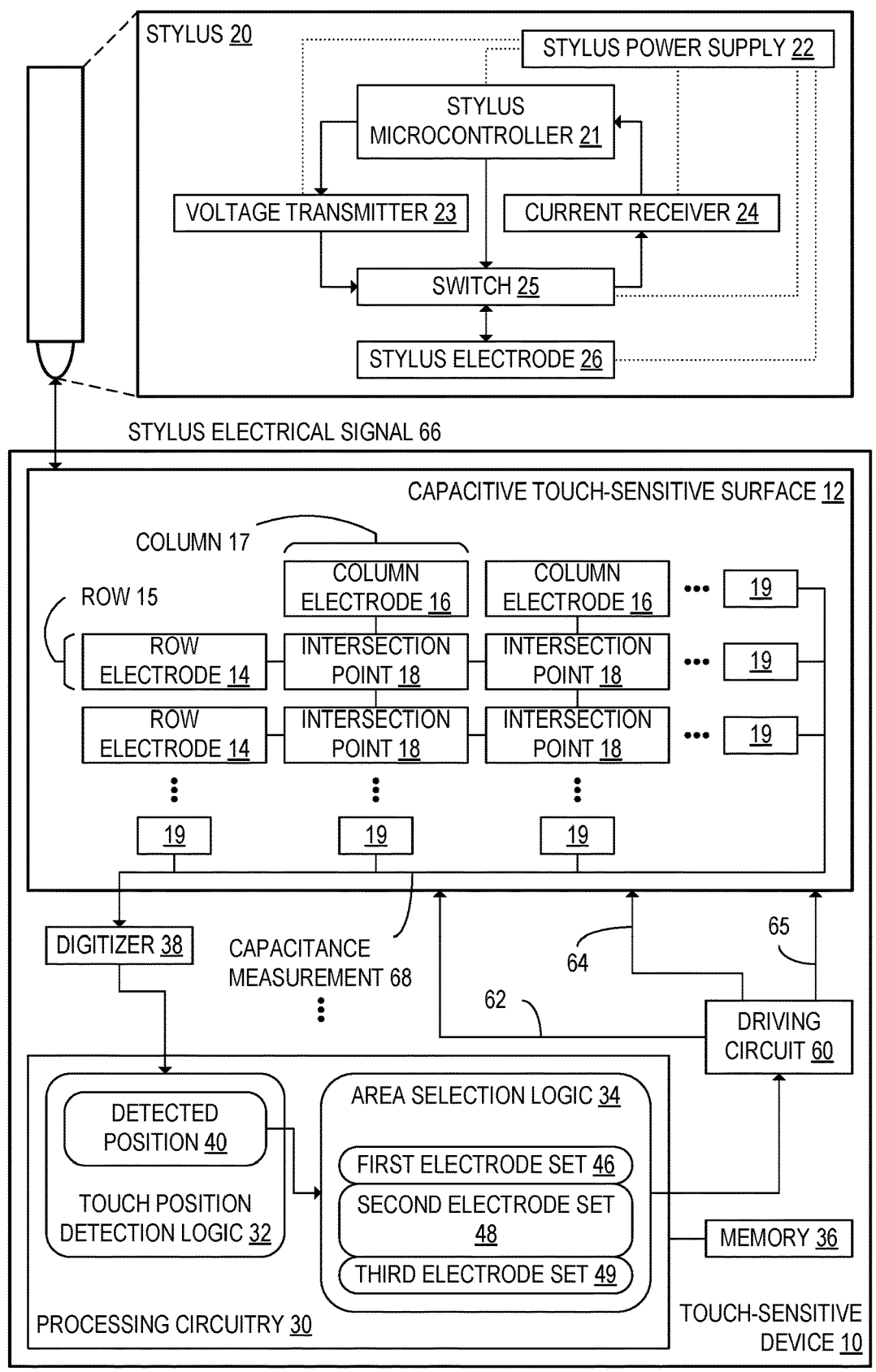
FIG. 1 schematically shows a touch-sensitive device including a capacitive touch-sensitive surface having a plurality of row electrodes and a plurality of column electrodes, and further shows a stylus, according to one example configuration.

In order to address the above issues, a touch-sensitive device 10 is provided, as shown schematically in FIG. 1 according to one example embodiment. The touch-sensitive device 10 may include a capacitive touch-sensitive surface 12 including an array of electrodes. The array of electrodes may include a plurality of row electrodes 14 arranged in a plurality of rows 15. In addition, the array of electrodes may include a plurality of column electrodes 16 arranged in a plurality of columns 17. The rows 15 and the columns 17 of the array may form a plurality of intersection points 18. The capacitive touch-sensitive surface 12 may further include a plurality of sensing electrodes 19 that are respectively coupled to the plurality of row electrodes 14 and the plurality of column electrodes 16. The sensing electrodes 19 may be arranged at the ends of the rows 15 and the columns 17, as shown in the example of FIG. 1, or at other locations in the capacitive touch-sensitive surface 12.

The touch-sensitive device 10 may further include processing circuitry 30. The processing circuitry 30 may be configured to receive inputs from the capacitive touch-sensitive surface 12 and from a stylus 20. The inputs received at the processing circuitry 30 from the capacitive touch-sensitive surface 12 may be capacitance measurements 68 made at the sensing electrodes 19. Each capacitance measurement 68 may be a measurement of a capacitance between an intersection point 18 and ground. These inputs may be received via a digitizer 38, which may be configured to perform analog-to-digital conversion on the received signals. In addition, the processing circuitry 30 may be configured to convey outputs to a driving circuit 60. The driving circuit 60 may be configured to output driving signals to the capacitive touch-sensitive surface 12, as discussed in further detail below. In some examples, the touch-sensitive device 10 may further include memory 36 that is coupled to the processing circuitry 30 and is configured to store data related to processing steps performed at the processing circuitry 30.

FIG. 1 further shows an example stylus 20 that may be configured to transmit a stylus electrical signal 66 to the touch-sensitive device 10 via the capacitive touch-sensitive surface 12. This stylus electrical signal 66 may induce charges at the sensing electrodes 19. Thus, the capacitance measurements 68 may be measurements of the stylus electrical signal 66. The stylus 20 may include a stylus microcontroller 21, which may be configured to output signals to a voltage transmitter 23 and receive signals via a current receiver 24. The stylus 20 may further include a stylus electrode 26, which may be an electrically conductive component that is located at a tip of the stylus and is configured to contact the capacitive touch-sensitive surface 12. The stylus 20 may be switched between an input-receiving mode and an output-transmitting mode via a switch 25 coupled to the voltage transmitter 23 and the current receiver 24. The switch 25 may, for example, be controlled by the stylus microcontroller 21 and may be configured to activate and deactivate the voltage transmitter 23 and the current receiver 24 at a predetermined time interval. The stylus 20 may further include a stylus power supply 22 that is configured to provide electrical power to the stylus microcontroller 21, the voltage transmitter 23, the current receiver 24, the switch 25, and the stylus electrode 26. For example, the stylus power supply 22 may be a battery.

The processing circuitry 30 of the touch-sensitive device 10 may be configured to determine a detected position 40 at which the stylus 20 contacts or hovers above the capacitive touch-sensitive surface 12. The detected position 40 may be determined at touch position detection logic 32. The detected position 40 may be determined based at least in part on the one or more capacitance measurements 68 of the capacitive touch-sensitive surface 12 that may be received at the processing circuitry 30 via the digitizer 38. The detected position 40 may be located proximate to an intersection point 18 between a row 15 and a column 17. In some examples, the processing circuitry 30 may be configured to determine the detected position 40 at least in part by interpolating between a plurality of capacitance measurements 68 associated with a respective plurality of intersection points 18 between the rows 15 and the columns 17 of the array. By interpolating between the plurality of capacitance measurements 68, the processing circuitry 30 may determine the detected position 40 with greater accuracy than would be achieved by associating the detected position 40 with a single intersection point 18.

Figure 2:
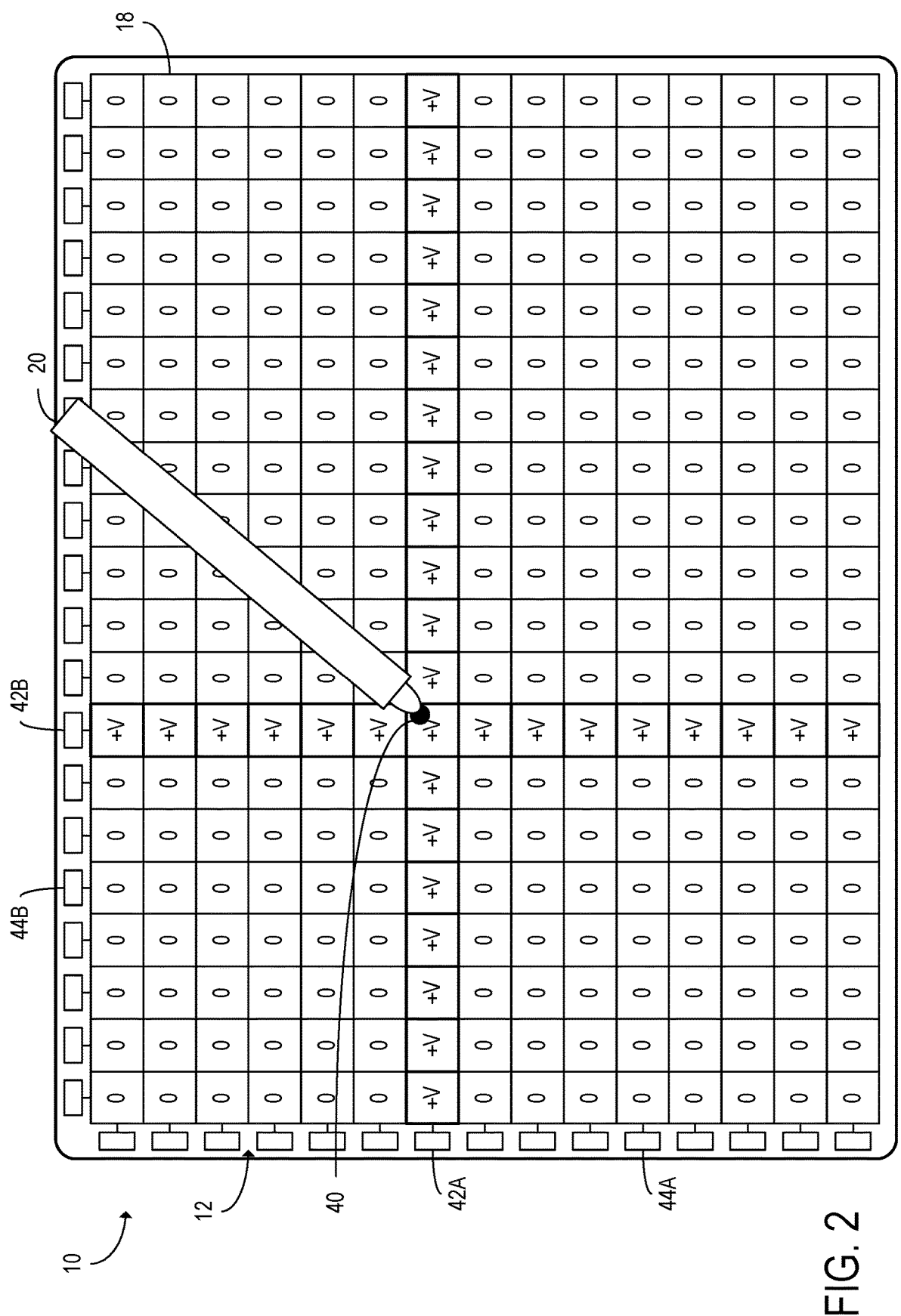
FIG. 2 shows the capacitive touch-sensitive surface of the touch-sensitive device when a first electrode set receives a first driving signal and a second electrode set receives a second driving signal, according to the configuration of FIG. 1.

The processing circuitry 30 may be further configured to determine, based at least in part on the detected position 40, a first electrode set 46 and a second electrode set 48 of the electrodes included in the array. The first electrode set 46 and the second electrode set 48 may be determined at area selection logic 34 included in the processing circuitry 30. The first electrode set 46 may be selected such that the detected position 40 is located proximate to one or more first row electrodes 42A and/or one or more first column electrodes 42B included in the first electrode set 46, as shown in the example of FIG. 2. FIG. 2 shows the example touch-sensitive device 10 of FIG. 1 when the first electrode set 46 includes one row electrode 14 and one column electrode 16. The detected position 40 may be located proximate to a first intersection point between a first row of a first row electrode 42A included in the first electrode set 46 and a first column of a first column electrode 42B included in the first electrode set 46.

As shown in FIG. 2, the second electrode set 48 may include a plurality of second row electrodes 44A and a plurality of second column electrodes 44B not included in the first electrode set 46. The first electrode set 46 and the second electrode set 48 may be disjoint. In the example of FIG. 2, the second electrode set 48 includes each electrode not included in the first electrode set 46.

Returning to FIG. 1, the touch-sensitive device 10 may further include a driving circuit 60 coupled to the processing circuitry 30, as discussed above. The driving circuit 60 may be configured to transmit a first driving signal 62 to the first electrode set 46. In addition, the driving circuit 60 may be further configured to transmit a second driving signal 64 that differs from the first driving signal 62 to the second electrode set 48. The first driving signal 62 and the second driving signal 64 may be transmitted to the capacitive touch-sensitive surface 12 in order to convey a control signal to the stylus microcontroller 21 of the stylus 20.

In some examples, the first driving signal 62 may be a first pseudo-random noise signal and the second driving signal 64 may be a second pseudo-random noise signal. Using pseudo-random noise signals for the first driving signal 62 and the second driving signal 64 may make the first driving signal 62 and the second driving signal 64 resistant to adverse noise effects from other sources across all frequencies. In addition, a pseudo-random noise signal may have a narrow autocorrelation, which may allow more precise temporal synchronization between the stylus 20 and the touch-sensitive device 10 to be performed.

In other examples, the first driving signal 62 and the second driving signal 64 may be periodic signals, and the second driving signal 64 may have a phase shift relative to the first driving signal 62. Using periodic signals for the first driving signal 62 and the second driving signal 64 may make the first driving signal 62 and the second driving signal 64 more resistant to noise at most frequencies compared to pseudo-random noise signals, at the cost of making the first driving signal 62 and the second driving signal 64 less resistant to noise at some specific frequencies. When the first driving signal 62 and the second driving signal 64 are periodic signals, frequency hopping may be performed in order to select a frequency at which noise is low.

Alternatively, as shown in FIG. 2, the first electrode set 46 may be driven with a first driving signal 62 having a voltage +V, while the second driving signal 64 is a zero-voltage signal. Thus, the first electrode set 46 may be driven while the second electrode set 48 is not driven. The voltage +V with which the first electrode set 46 is driven may be a constant voltage, a pseudo-random noise signal, or a signal with some other waveform. By using a zero-voltage signal for the second driving signal 64, power consumption by the touch-sensitive device 10 may be reduced.

By driving the one or more electrodes corresponding to coordinates of the detected position 40 with the first driving signal 62 while driving the other electrodes of the array with the second driving signal 64, an induced signal corresponding to the first driving signal 62 may be provided to the stylus 20 without having to transmit the first driving signal 62 to all electrodes. Thus, charges induced in other components of the touch-sensitive device 10 may be reduced while maintaining communication to the stylus 20. As the stylus 20 moves along the capacitive touch-sensitive surface 12, the first electrode set 46 and the second electrode set 48 may be dynamically updated as the detected position 40 of the stylus 20 changes. Accordingly, the processing circuitry 30 may modify the first electrode set 46 to track the position of the stylus 20 and continue to provide the first driving signal 62 to the capacitive touch-sensitive surface 12 at the location at which the stylus 20 makes a touch input.

Figure 3:
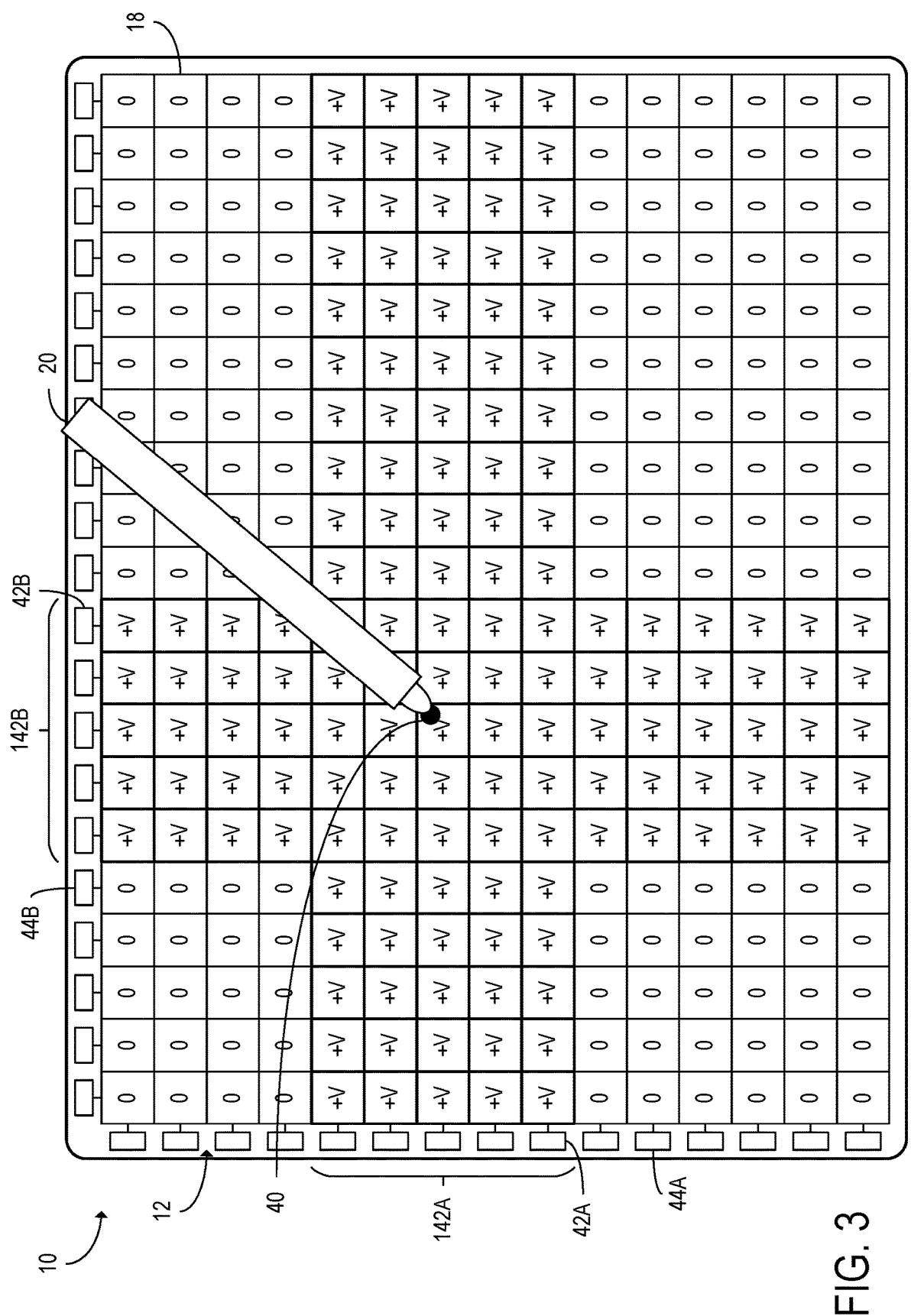
FIG. 3 shows the capacitive touch-sensitive surface of the touch-sensitive device when a plurality of adjacent row electrodes and a plurality of adjacent column electrodes receive the first driving signal, according to the configuration of FIG. 1.

In some examples, as shown in FIG. 3, the first electrode set 46 may include a plurality of adjacent first row electrodes 42A within a first row range 142A and a plurality of adjacent first column electrodes 42B within a first column range 142B. In the example of FIG. 3, the first row range 142A includes five first row electrodes 42A and the first column range 142B includes five first column electrodes 42B. The first row range 142A and the first column range 142B may be centered on an intersection point 18 that is located proximate to the detected position 40. By including a plurality of first row electrodes 42A and a plurality of first column electrodes 42B in the first electrode set 46 rather than one first row electrode 42A and one first column electrode 42B, the first driving signal 62 may be provided to the stylus 20 more consistently and with a higher current. However, a tradeoff of this approach is that the charge induced on other elements of the touch-sensitive device 10 may be increased.

Figure 4:
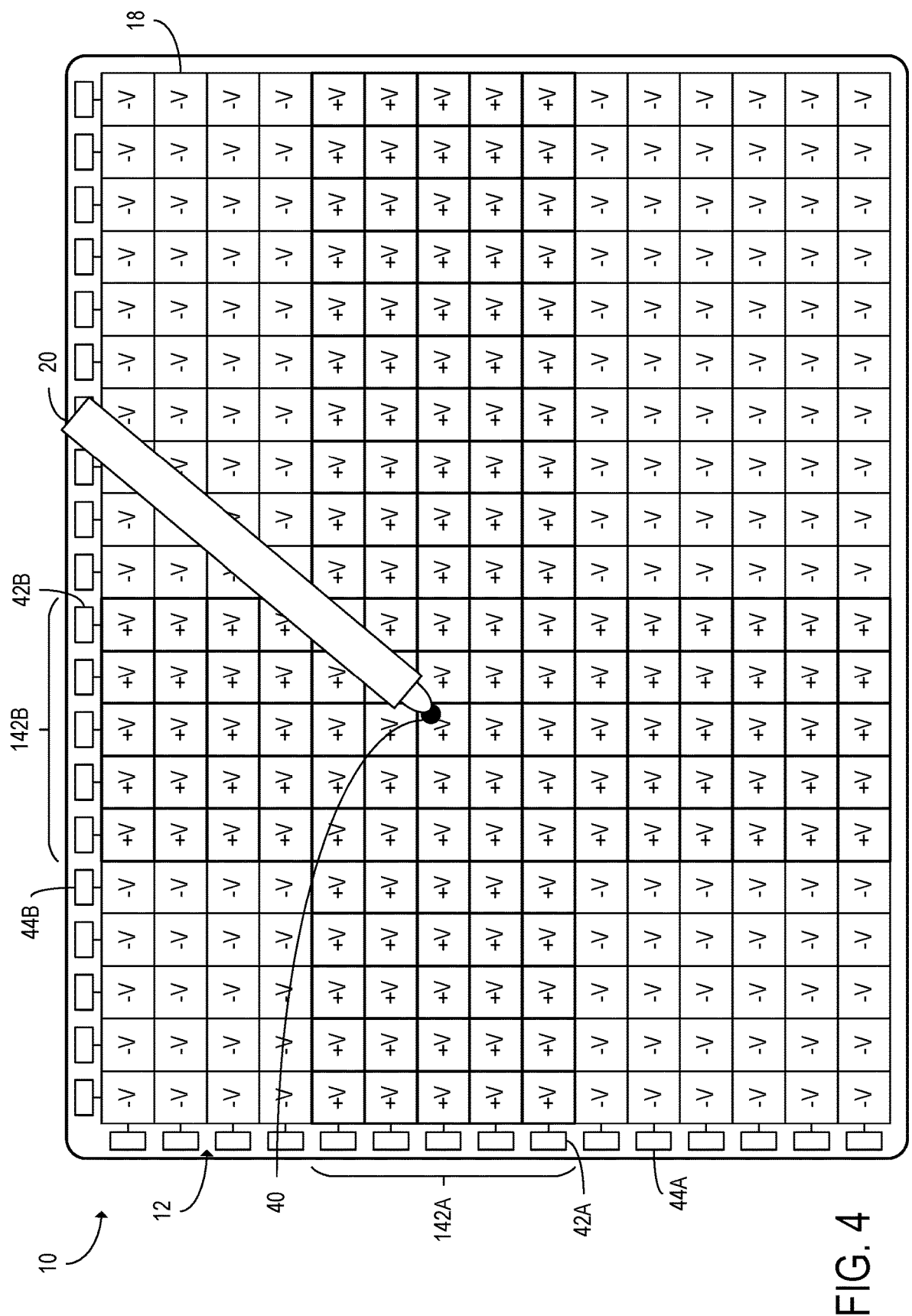
FIG. 4 shows the capacitive touch-sensitive surface of the touch-sensitive device when a first electrode set receives the first driving signal and a second electrode set receives a second driving signal that is opposite to the first driving signal, according to the configuration of FIG. 1.

In some examples, as shown in FIG. 4, the second driving signal 64 may be opposite to the first driving signal 62. For example, when the first driving signal 62 and the second driving signal 64 are periodic signals, the second driving signal 64 may be generated by applying a 180-degree phase shift to the first driving signal 62 to obtain the second driving signal 64. In the example of FIG. 4, each electrode included in the first electrode set 46 is driven with a voltage of +V and each electrode included in the second electrode set 48 is driven with a voltage of −V. In addition, in the example of FIG. 4, the first electrode set 46 and the second electrode set 48 include equal numbers of electrodes. Since equal numbers of electrodes are driven with driving voltages of +V and −V, the electric fields induced on other components of the touch-sensitive device 10 by the first electrode set 46 and the second electrode set 48 may counteract each other, thereby reducing the total induced charges on such components.

Figure 5A:
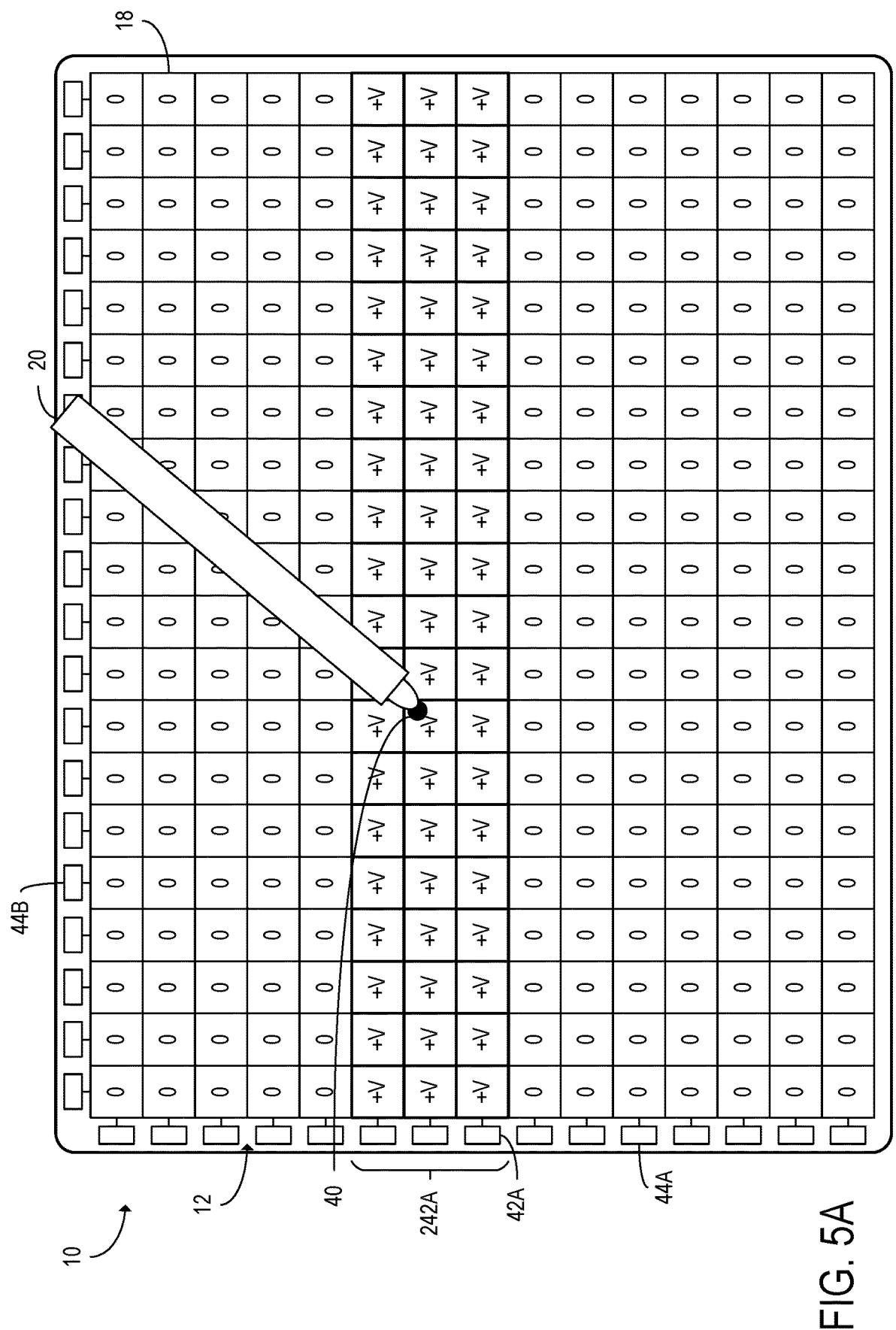
FIG. 5A shows the capacitive touch-sensitive surface of the touch-sensitive device when the first electrode set includes a plurality of row electrodes without including one or more column electrodes, according to the configuration of FIG. 1.
Figure 5B:
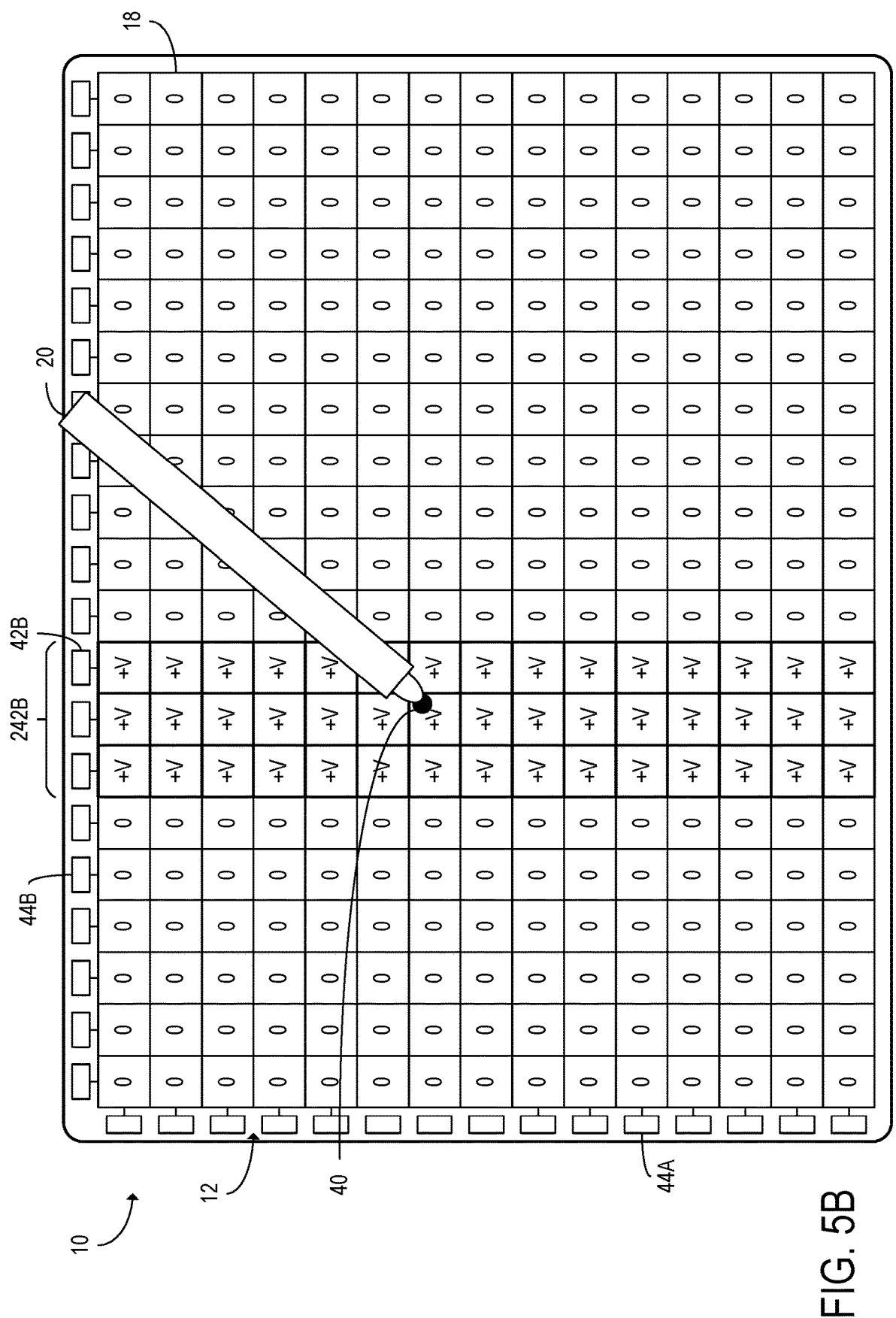
FIG. 5B shows the capacitive touch-sensitive surface of the touch-sensitive device when the first electrode set includes a plurality of column electrodes without including one or more row electrodes, according to the configuration of FIG. 1.

In some examples, as shown in FIG. 5A, the first electrode set 46 may include one or more first row electrodes 42A without including one or more first column electrodes 42B. In the example of FIG. 5A, the first electrode set 46 includes a plurality of first row electrodes 42A within a first row range 242A. Alternatively, as shown in the example of FIG. 5B, the first electrode set 46 may include one or more first column electrodes 42B without including one or more first row electrodes 42A. In the example of FIG. 5B, the first electrode set 46 includes a plurality of first column electrodes 42B within a first column range 242B.

Returning to FIG. 1, the processing circuitry 30 may, in some examples, be configured to determine a plurality of electrode sets that includes more than the two electrode sets described above. Thus, the processing circuitry 30 may be configured to determine three or more electrode sets. For example, rather than including, in a second electrode set 48, all electrodes not included in the first electrode set 46, the processing circuitry 48 may be configured to divide the electrodes that are not included in the first electrode set 46 into a second electrode set 48 and a third electrode set 49. The third electrode set 49 may receive a third driving signal that differs from both the first driving signal 62 and the second driving signal 64. For example, the first driving signal 62, the second driving signal 64, and the third driving signal 65 may be periodic signals. In such an example, the second driving signal 64 and the third driving signal 65 may be generated by applying a 120-degree phase shift and a 240-degree phase shift, respectively, to the first driving signal 62.

Figure 6:
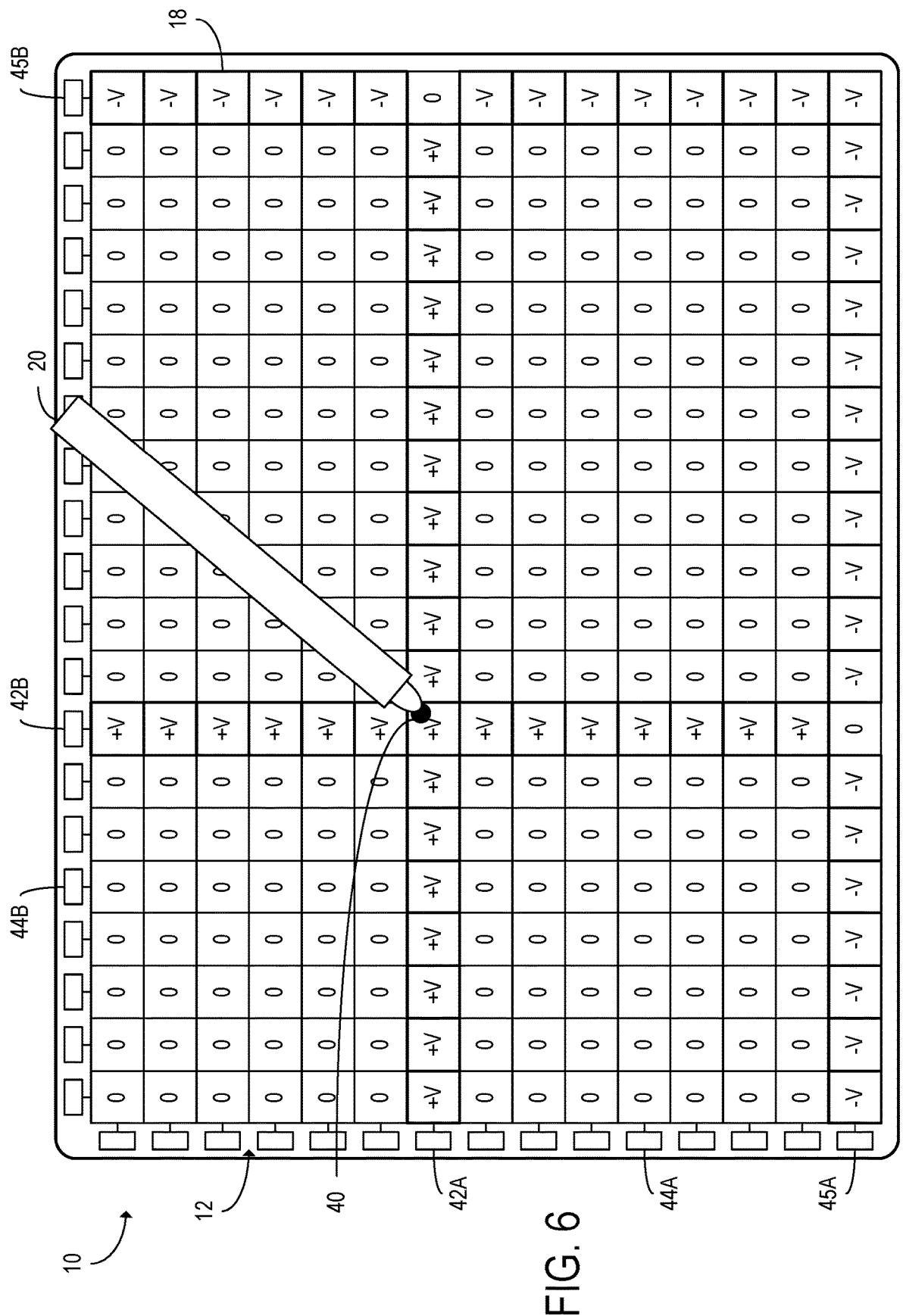
FIG. 6 shows the capacitive touch-sensitive surface of the touch-sensitive device when a first electrode set, a second electrode set, and a third electrode set are selected, according to the configuration of FIG. 1.

FIG. 6 shows an example of the capacitive touch-sensitive display 12 when a first electrode set 46, and second electrode set 48, and a third electrode set 49 are selected. In the example of FIG. 6, the first electrode set 46 includes a first row electrode 42A and a first column electrode 42B, and the third electrode set 49 includes a third row electrode 45A and a third column electrode 45B. Each row electrode 14 and each column electrode 16 not included in the first electrode set 46 or the third electrode set 49 is included in the second electrode set 48. In the example of FIG. 6, the first electrode set is driven with a first driving signal 62 having a voltage of +V, the second electrode set 48 is driven with a second driving signal 64 having a voltage of zero, and the third electrode set 49 is driven with a third driving signal 65 having a voltage of −V. Thus, the total voltage applied to the capacitive touch-sensitive display 12 may zero. In this example, the third electrode set 49 is selected such that the electrodes of the third electrode set 49 are located as far as possible from the electrodes of the first electrode set 46. By positioning the electrodes of the third electrode set 49 as far as possible from the electrodes of the first electrode set 46, the effect of the third driving signal 65 on the plurality of capacitance measurements 68 may be reduced.

Figure 7A:
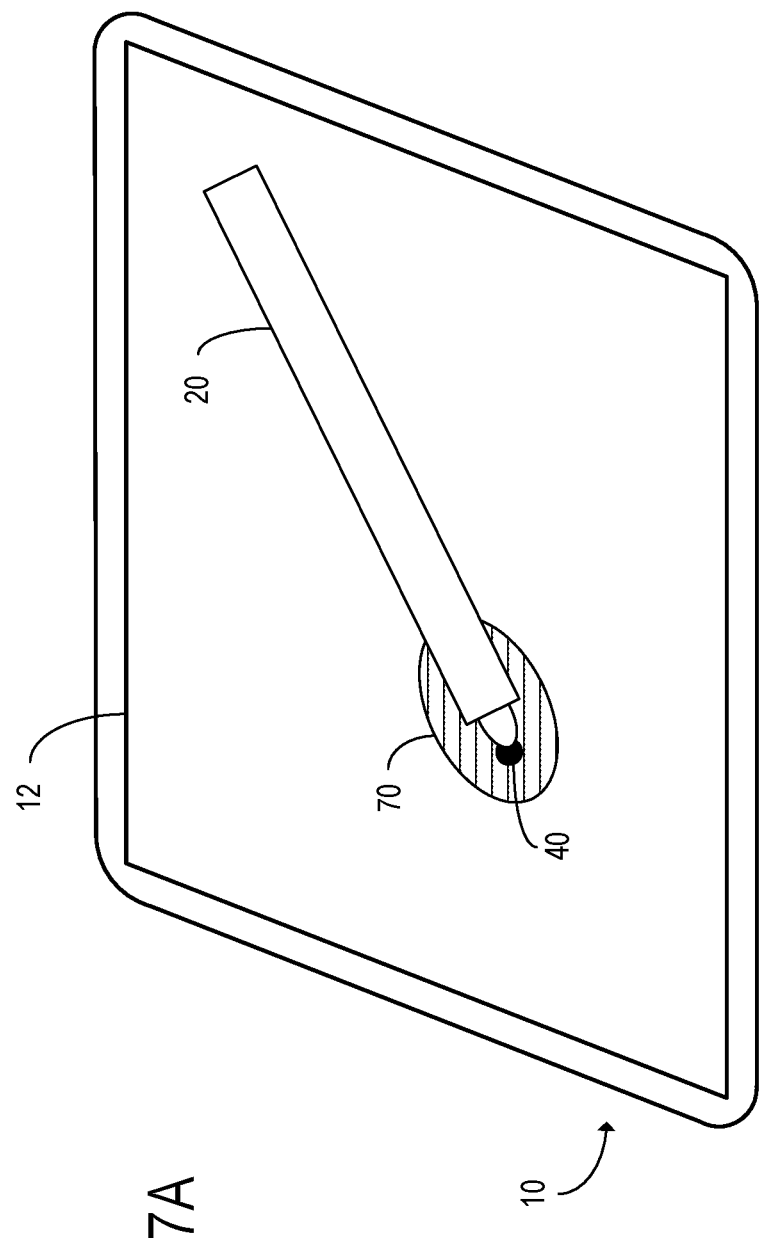
FIG. 7A shows the capacitive touch-sensitive surface of the touch-sensitive device when a charge distribution induced on the capacitive touch-sensitive surface by the stylus is skewed, according to the configuration of FIG. 1.
Figure 7B:
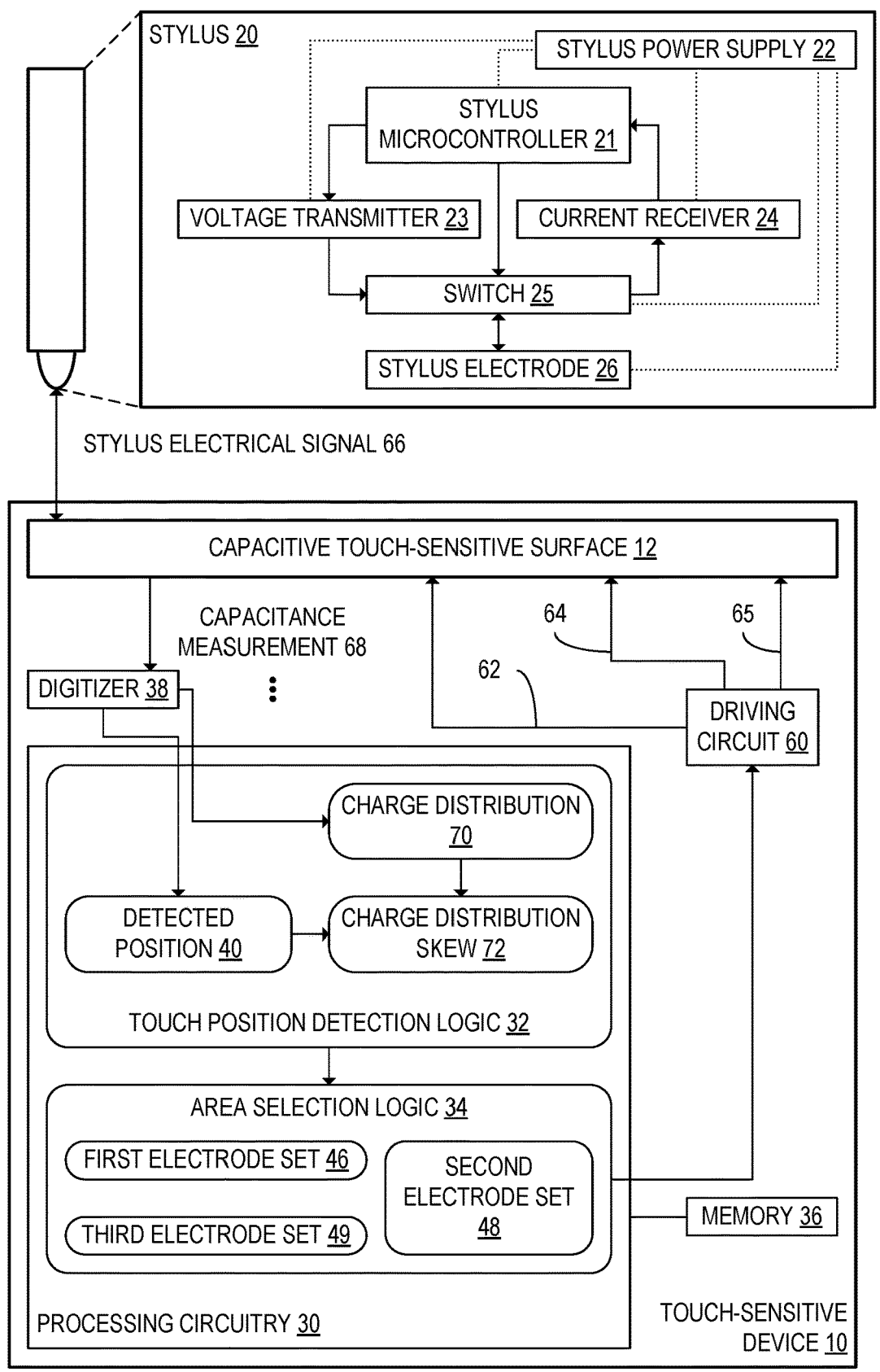
FIG. 7B schematically shows the touch-sensitive device and the stylus when the charge distribution of FIG. 7A is computed from a plurality of capacitance measurements.

FIG. 7A shows the example touch-sensitive device 10 of FIG. 1 when the stylus 20 is held at an angle relative to the capacitive touch-sensitive surface 12. In the example of FIG. 7A, the processing circuitry 30 of the touch-sensitive device 10 may be configured to interpolate between a plurality of capacitance measurements 68 to determine the detected position 40, as discussed above. In addition, the processing circuitry 30 may be configured to determine a charge distribution 70 on the capacitive touch-sensitive surface 12 based at least in part on the capacitance measurements 68. FIG. 7B schematically shows the processing circuitry 30 when the charge distribution 70 is computed.

The processing circuitry 30 may be configured to determine, based at least in part on the plurality of capacitance measurements 68, that the charge distribution 70 induced on the capacitive touch-sensitive surface 12 by the stylus 20 is skewed relative to the detected position 40. When the charge distribution 70 is skewed relative to the detected position 40 of the stylus 20, the detected position 40 is not located at the center of the charge distribution 70. As shown in FIG. 7B, the processing circuitry 30 may be configured to compute a charge distribution skew 72 based at least on the detected position 40 and the charge distribution 70. The charge distribution skew 72 may occur, for example, as a result of fringing effects when the stylus 20 is held at an angle relative to the capacitive touch-sensitive surface 12 as shown in the example of FIG. 7A.

Figure 7C:
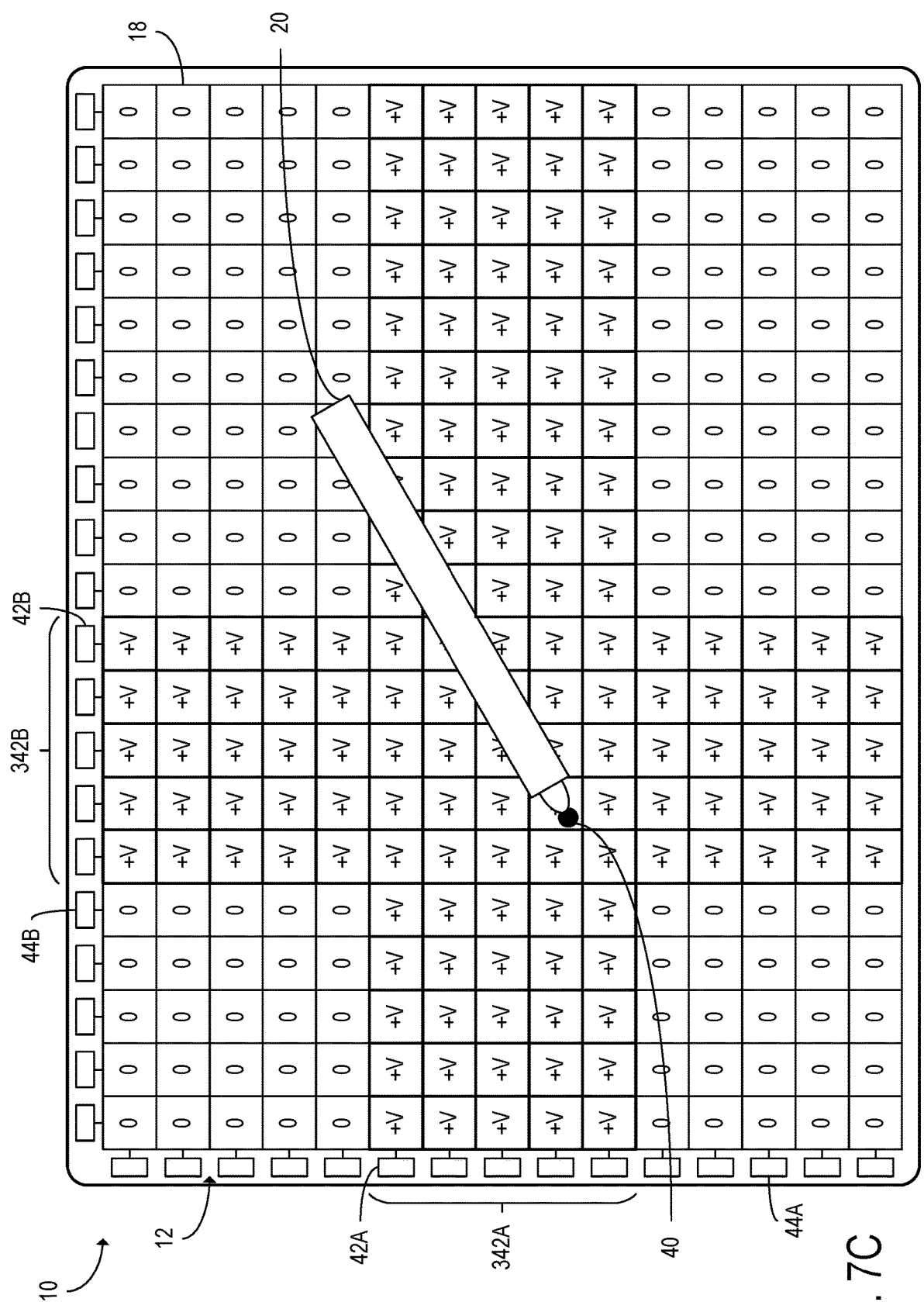
FIG. 7C shows the capacitive touch-sensitive surface of the touch-sensitive device as shown in FIG. 7A when the detected position of the stylus is off-center within a first row range and a first column range.

In the example of FIGS. 7A and 7B, the first electrode set may include a plurality of adjacent first row electrodes 42A within a first row range 142A and a plurality of adjacent first column electrodes 42B within a first column range 142B, as discussed above with reference to FIG. 3. When the processing circuitry 30 determines that the charge distribution 70 is skewed relative to the capacitive touch-sensitive surface 12, the processing circuitry 30 may be further configured to select the first electrode set 46 based at least in part on the charge distribution 70 such that the detected position 40 is off-center within at least one of the first row range 142A and the first column range 142B. FIG. 7C shows an example of a first electrode set 46 that is selected such that the detected position 40 is off-center within both a first row range 342A and a first column range 342B. In other examples, the detected position 40 may be off-center within one of the first row range 342A and the first column range 342B but not the other. By positioning the first electrode set 46 such that the detected position 40 is off-center, the processing circuitry 30 may provide a sufficiently high-voltage signal to the stylus when the stylus is held at an angle.

FIG. 8 shows an example phase cycle 80 including a plurality of phases in which communication between the touch-sensitive device 10 and the stylus 20 may be performed. In some examples, as shown in FIG. 8, the processing circuitry 30 may be configured to loop through an uplink phase 82 and a downlink phase 84 when the touch-sensitive device 10 is used with the stylus 20. During the uplink phase 82, the driving circuit 60 may be configured to transmit the first driving signal 62 and the second driving signal 64 to the capacitive touch-sensitive surface 12. Synchronization between the stylus 20 and the capacitive touch-sensitive surface 12 may be performed during the uplink phase 82 such that a phase cycle of the stylus 20 temporally matches the phase cycle 80 in which the processing circuitry 30 loops through the uplink phase 82 and the downlink phase 84. In examples in which the first driving signal 62 and the second driving signal 64 are periodic signals, frequency hopping may also be performed during the uplink phase 82 to select a frequency with low noise and good signal fidelity.

During the downlink phase 84, the capacitive touch-sensitive surface 12 may be further configured to receive the stylus electrical signal 66 from the stylus 20. The processing circuitry 30 may be configured to determine the detected position 40 based at least in part on the stylus electrical signal 66. The charge distribution 70 on the capacitive touch-sensitive surface 12 may be measured during the downlink phase 84.

Following the downlink phase 84, the processing circuitry 30 may be further configured to return to the uplink phase 82. Alternatively, one or more additional phases may be performed during the phase cycle 80. When one or more additional phases are performed, the one or more additional phases may occur after the uplink phase 82 and/or the downlink phase 84 in the phase cycle 80.

Figure 9:
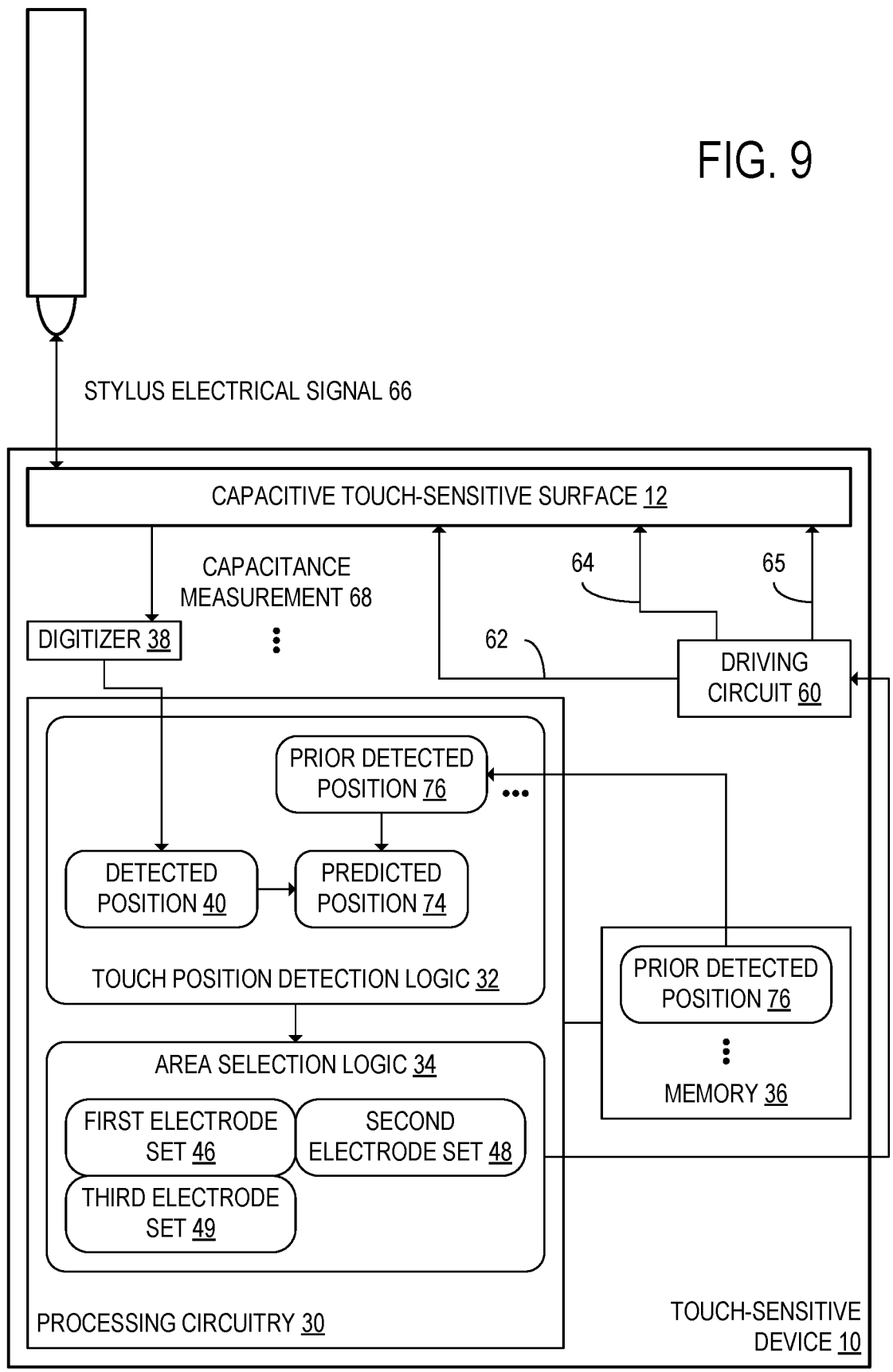
FIG. 9 schematically shows the touch-sensitive device when a predicted position of the stylus is computed based at least in part on a plurality of prior detected positions, according to the configuration of FIG. 1.

In some examples, as schematically shown in FIG. 9, the memory 36 of the touch-sensitive device 10 may be configured to store a plurality of prior detected positions 76 at which the stylus 20 previously contacted or hovered above the capacitive touch-sensitive surface 12. The prior detected positions 76 may have been detected in the respective downlink phases 84 of one or more phase cycles 80 prior to a current phase cycle 80. Based at least in part on the plurality of prior detected positions 76, the processing circuitry 30 may be further configured to compute a predicted position 74 at which the stylus 20 is predicted to contact or hover above the capacitive touch-sensitive surface 12 at a future phase cycle 80. For example, the processing circuitry 30 may be configured to compute an estimated velocity for the stylus 20 based at least in part on two or more prior detected positions 76. In such examples, the processing circuitry 30 may be further configured to compute the predicted position 74 by multiplying the estimated velocity by the duration of a phase cycle 80 and adding the resulting predicted displacement to the detected position 40 for the current phase cycle 80.

The processing circuitry 30 may be further configured to select the first electrode set 46 and the second electrode set 48 based at least in part on the predicted position 74. For example, the processing circuitry 30 may be further configured to select the first electrode set 46 such that the predicted position 74 is located proximate to an intersection point 18 between a first row electrode 42A and a first column electrode 42B included in the first electrode set 46.

Figure 10:
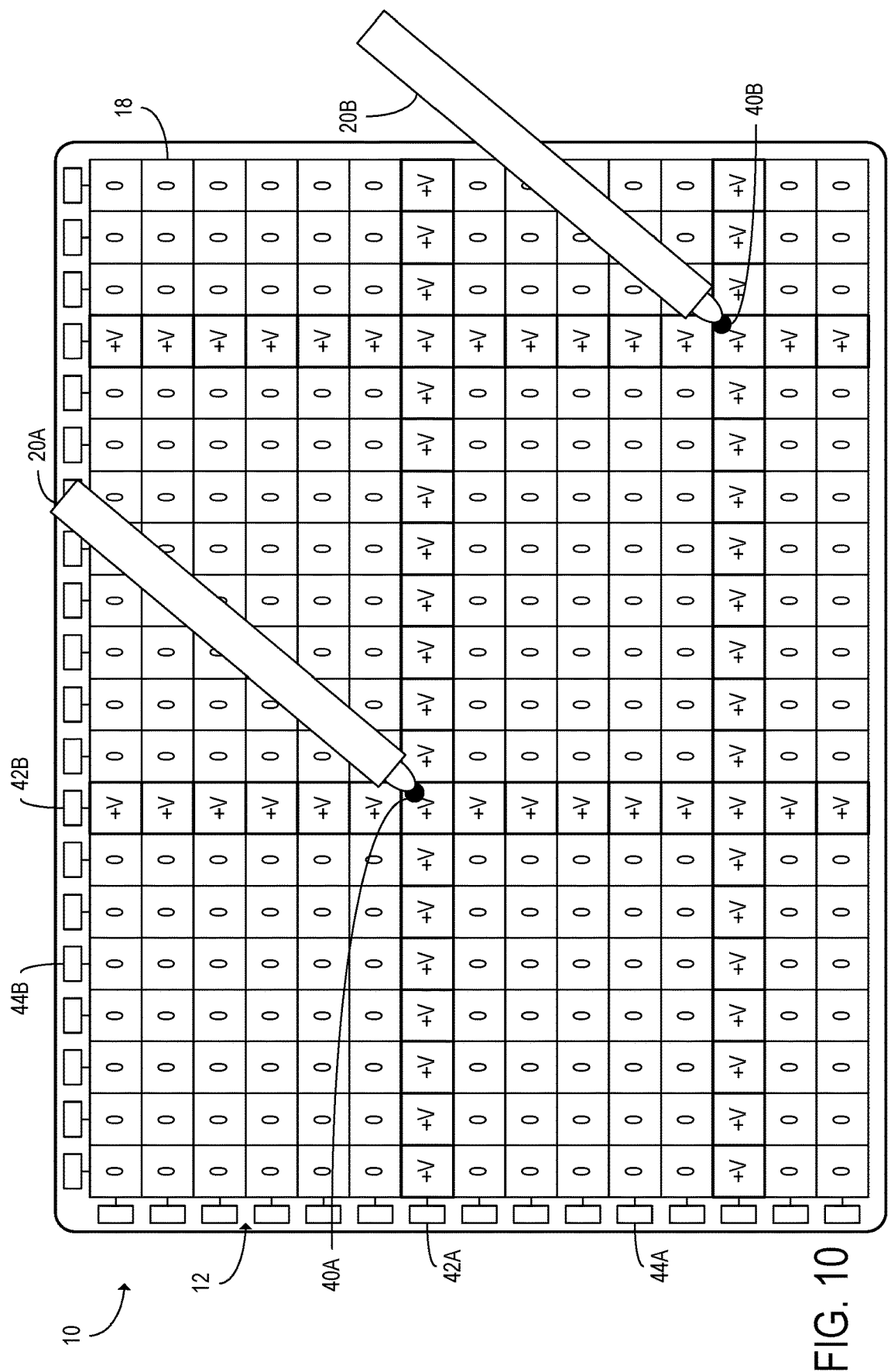
FIG. 10 shows the capacitive touch-sensitive surface of the touch-sensitive device when a first stylus and a second stylus touch the capacitive touch-sensitive surface, according to the configuration of FIG. 1.

In some examples, as shown in FIG. 10, the touch-sensitive device 10 may be a multi-touch device configured to concurrently receive a plurality of touch inputs at the capacitive touch-sensitive surface 12. FIG. 10 shows a first stylus 20A and a second stylus 20B that respectively contact the capacitive touch-sensitive surface 12 at a first detected position 40A and a second detected position 40B. Thus, the first electrode set 46 may include a plurality of non-adjacent first row electrodes 42A. In addition, the first electrode set 46 may include a plurality of non-adjacent first column electrodes 42B. Although the first electrode set 46 includes both non-adjacent first row electrodes 42A and non-adjacent first column electrodes 42B in the example of FIG. 10, the first electrode set 46 may, in other examples, include non-adjacent first row electrodes 42A or non-adjacent first column electrodes 42B without including the other.

Figure 11:
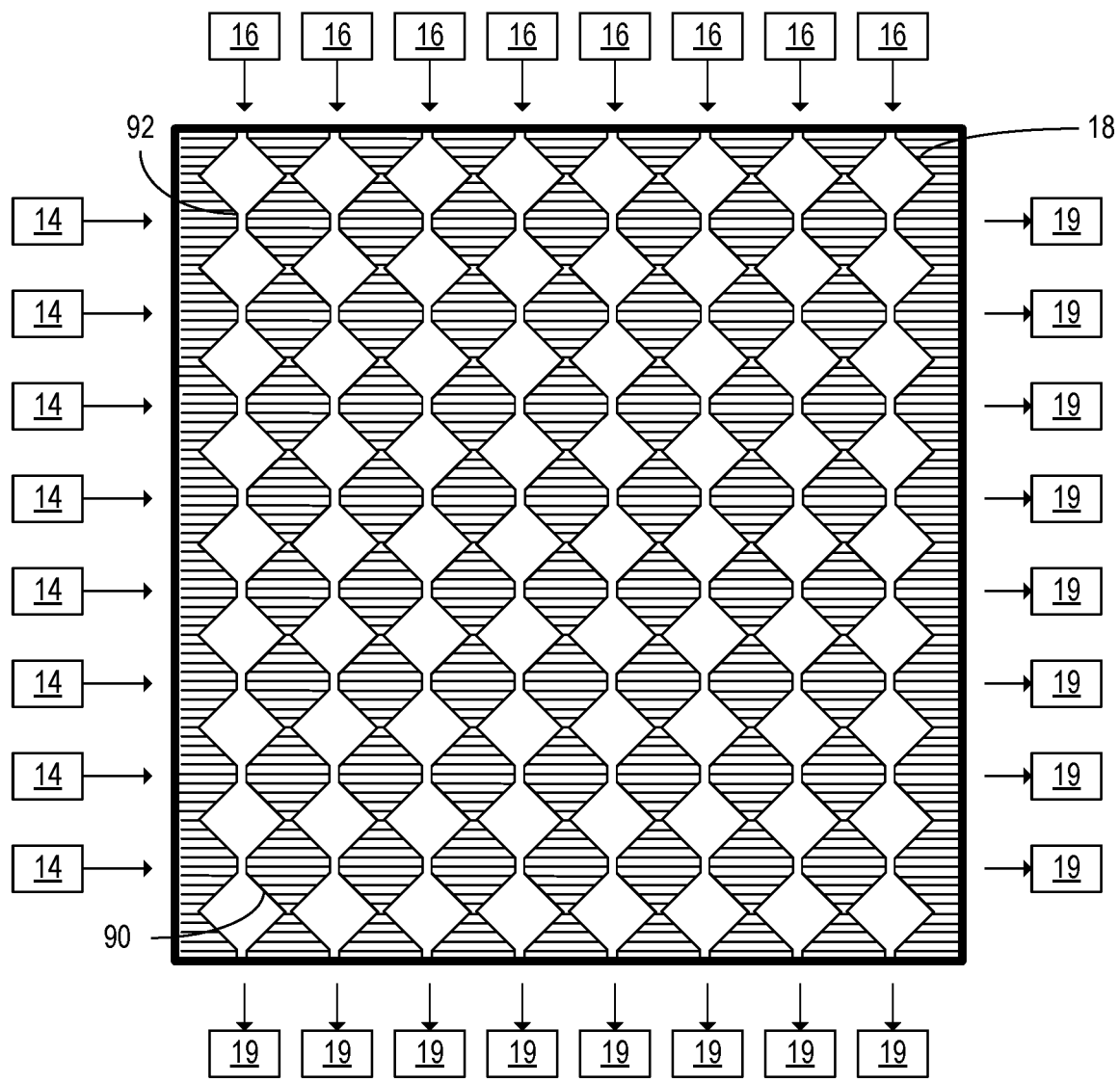
FIG. 11 shows an example electrode geometry of intersection points formed by the row electrodes and the column electrodes, according to the configuration of FIG. 1.

FIG. 11 shows an example electrode geometry of the intersection points 18 formed by the row electrodes 14 and the column electrodes 16 included in a representative portion of the capacitive touch-sensitive surface 12. In the example of FIG. 11, the intersection points 18 are formed by diamond-shaped portions of horizontal conductive traces 90 and vertical conductive traces 92 that are electrically coupled to respective row electrodes 14 and column electrodes 16. The vertical conductive traces 92 coupled to the column electrodes 16 overlap the horizontal conductive traces 90 coupled to the row electrodes 14 in the example of FIG. 11. In addition, FIG. 11 shows the sensing electrodes 19 associated with the plurality of rows 15 and the plurality of columns 17.

Figure 12A:
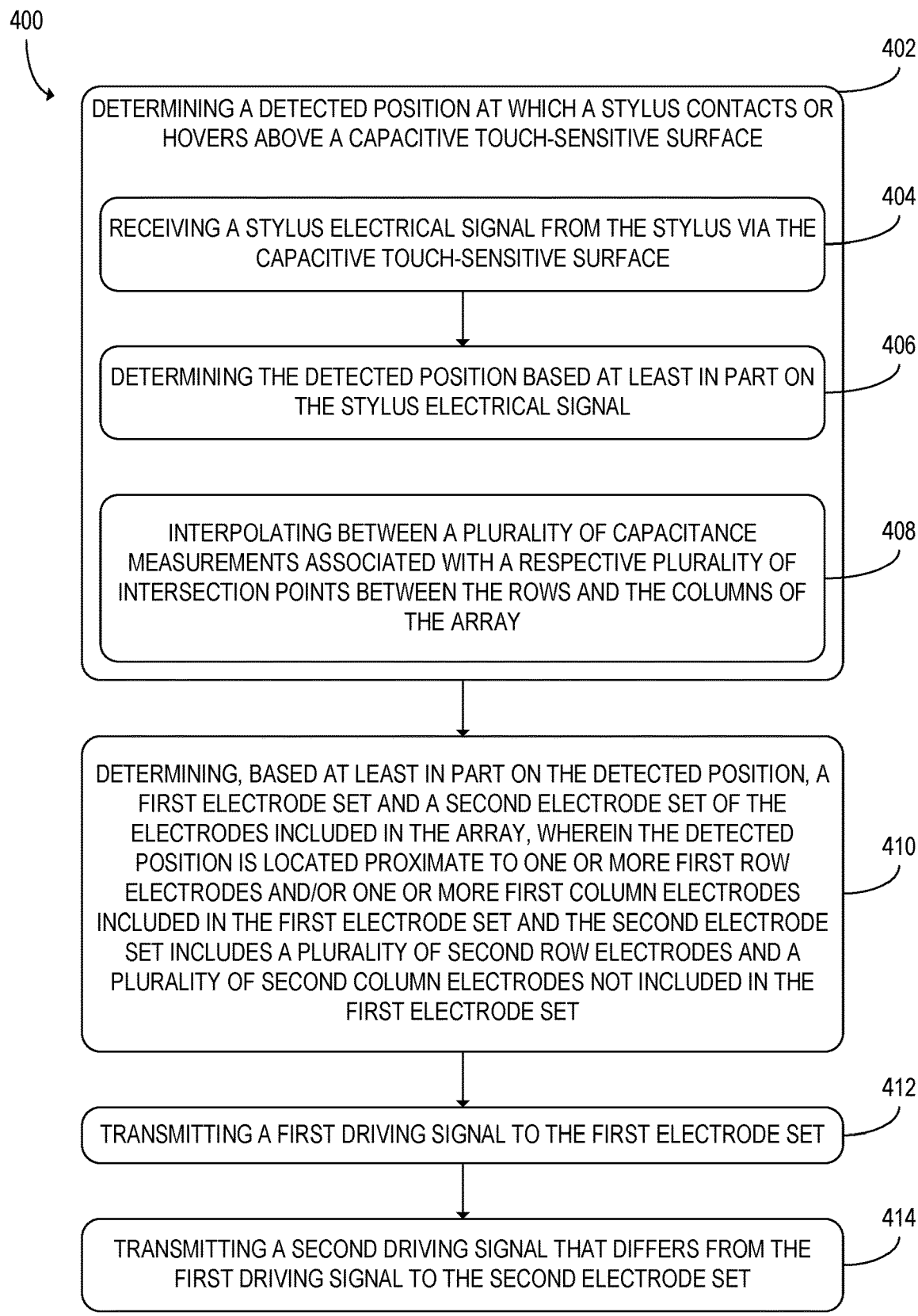
FIG. 12A shows a flowchart of an example method for use with a touch-sensitive device, according to the configuration of FIG. 1.

FIG. 12A shows a flowchart of an example method 400 for use with a touch-sensitive device. The touch-sensitive device with which the method 400 is used may be the touch-sensitive device 10 of FIG. 1 or some other touch-sensitive device. As discussed above, the touch-sensitive device may include a capacitive touch-sensitive surface with an array of electrodes arranged in a plurality of rows and a plurality of columns. In addition, the touch-sensitive device may include processing circuitry that is configured to process data received at the capacitive touch-sensitive array.

At step 402, the method 400 may include determining a detected position at which a stylus contacts or hovers above the capacitive touch-sensitive surface. In some examples, step 402 may include, at step 404, receiving a stylus electrical signal from the stylus via the capacitive touch-sensitive surface. The stylus that contacts or hovers above the capacitive touch-sensitive surface may be an active stylus that is configured to transmit the stylus electrical signal to the processing circuitry of the touch-sensitive device via the capacitive touch-sensitive surface. In such examples, step 402 may further include, at step 406, determining the detected position based at least in part on the stylus electrical signal. The detected position may be determined at least in part by detecting a position on the capacitive touch-sensitive surface at which the stylus electrical signal is received.

Additionally or alternatively to determining the detected position based at least in part on the stylus electrical signal, step 402 may include, at step 408, interpolating between a plurality of capacitance measurements associated with a respective plurality of intersection points between the rows and the columns of the array.

At step 410, the method 400 may further include determining, based at least in part on the detected position, a first electrode set and a second electrode set of the electrodes included in the array. The first electrode set may be selected such that the detected position is located proximate to one or more first row electrodes and/or one or more first column electrodes included in the first electrode set. The second electrode set may include a plurality of second row electrodes and a plurality of second column electrodes not included in the first electrode set. The second electrode set may include all electrodes in the array that are not included in the first electrode set.

In some examples, the first electrode set may include a plurality of adjacent first row electrodes within a first row range and a plurality of adjacent first column electrodes within a first column range. The first electrode set and the second electrode set may include equal numbers of electrodes. Additionally or alternatively, the detected position may be located proximate to a first intersection point between a first row of a first row electrode of the one or more first row electrodes included in the first electrode set and a first column of a first column electrode of the one or more first column electrodes included in the first electrode set. Thus, in such examples, the electrodes included in the array may be driven at positions corresponding to the point at which the stylus contacts or hovers over the capacitive touch-sensitive surface.

At step 412, the method 400 may further include transmitting a first driving signal to the first electrode set. In addition, at step 414, the method 400 may further include transmitting a second driving signal that differs from the first driving signal to the second electrode set. The first driving signal and the second driving signal may be transmitted to the first electrode set and the second electrode set by a driving circuit configured to receive inputs from the processing circuitry. In some examples, the second driving signal is a zero-voltage signal. Alternatively, when the first driving signal and the second driving signal are periodic signals, the second driving signal may have a phase shift relative to the first driving signal. For example, the second driving signal may be shifted by 180 degrees relative to the first driving signal such that the second driving signal is opposite the first driving signal. As another example, the first driving signal may be a first pseudo-random noise signal and the second driving signal may be a second pseudo-random noise signal.

Figure 12B:
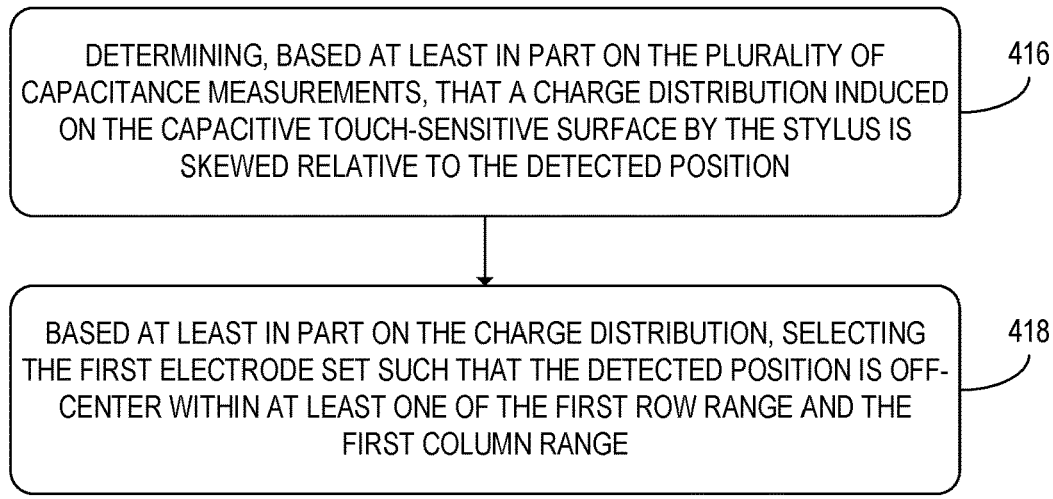
FIGS. 12B-12D show additional steps of the method of FIG. 12A that may be performed in some examples.

FIGS. 12B-12E show additional steps that may be performed when performing the method 400 in some examples. FIG. 12B shows steps that may be performed when the processing circuitry receives a plurality of capacitance measurements, as discussed above with reference to step 408, and when the first electrode set includes a plurality of adjacent first row electrodes within a first row range and a plurality of adjacent first column electrodes within a first column range. At step 416, the method 400 may further include determining, based at least in part on the plurality of capacitance measurements, that a charge distribution induced on the capacitive touch-sensitive surface by the stylus is skewed relative to the detected position. At step 418, the method 400 may further include selecting the first electrode set based at least in part on the charge distribution such that the detected position is off-center within at least one of the first row range and the first column range.

Figure 12C:
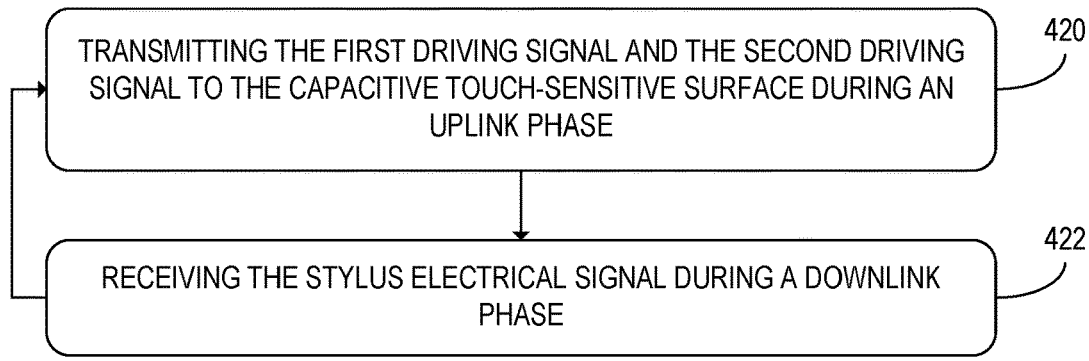

FIG. 12C shows steps of the method 400 by which the processing circuitry may loop through a phase cycle including an uplink phase and a downlink phase. At step 420, the method 400 may further include transmitting the first driving signal and the second driving signal to the capacitive touch-sensitive surface during an uplink phase. At step 422, the method 400 may further include receiving the stylus electrical signal during a downlink phase. The stylus electrical signal may be received in the downlink phase as a plurality of capacitance measurements made at a plurality of sensing electrodes when the stylus electrical signal induces charges in those sensing electrodes. Following the downlink phase, the processing circuitry may return to the uplink phase of step 420.

Figure 12D:
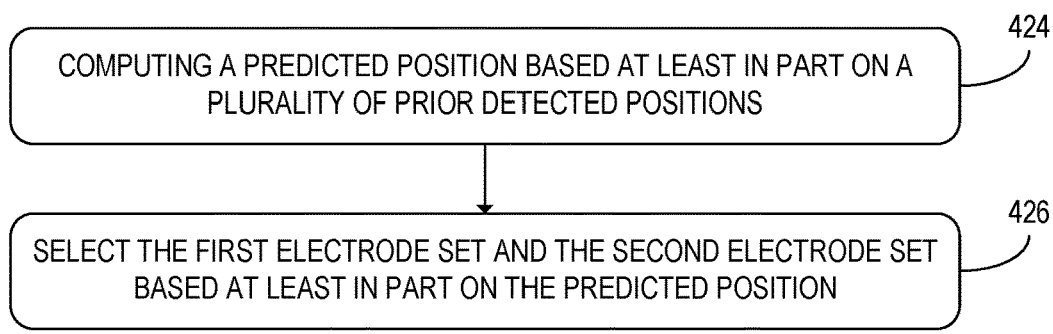

FIG. 12D shows steps that may be performed when detected positions of the stylus are stored in memory included in the touch-sensitive device. At step 424, the method 400 may further include computing a predicted position for the stylus based at least in part on a plurality of prior detected positions. The predicted position may be a position at which the stylus is predicted to contact or hover over the array in a subsequent phase cycle following the current phase cycle. At step 426, the method 400 may further include selecting the first electrode set and the second electrode set based at least in part on the predicted position. The first electrode set may be selected such that the predicted position is located proximate at least one intersection between a first row of a first row electrode included in the first electrode set and a first column of a first column electrode included in the first electrode set.

With the devices and methods discussed above, an active stylus may be supplied with an uplink signal through a capacitive touch-sensitive display while avoiding charge accumulation on other components of a touch-sensitive device. As a result of avoiding such charge accumulation, the systems and methods discussed above may make visual artifacts less likely to occur on a display included in the touch-sensitive device. Additionally or alternatively, other charge-sensitive components may be protected from charge accumulation.

In some embodiments, the methods and processes described herein may be tied to a computing system of one or more computing devices. In particular, such methods and processes may be implemented as a computer-application program or service, an application-programming interface (API), a library, and/or other computer-program product.

Figure 13:
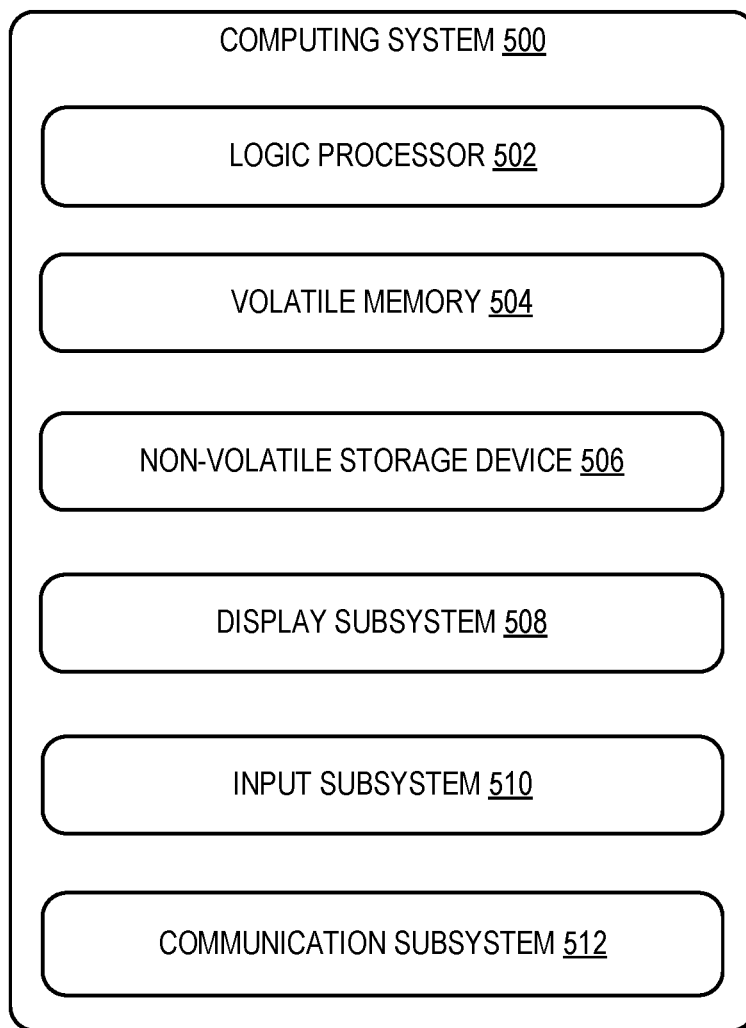
FIG. 13 shows a schematic view of an example computing environment in which the touch-sensitive device of FIG. 1 may be enacted.

FIG. 13 schematically shows a non-limiting embodiment of a computing system 500 that can enact one or more of the methods and processes described above. Computing system 500 is shown in simplified form. Computing system 500 may embody the touch-sensitive device 10 described above and illustrated in FIG. 1. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 13.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built-in. Non-volatile storage device 506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

The following paragraphs discuss several aspects of the present disclosure. According to one aspect of the present disclosure, a touch-sensitive device is provided, including a capacitive touch-sensitive surface. The capacitive touch-sensitive surface may include an array of electrodes arranged in a plurality of rows and a plurality of columns. The touch-sensitive device may further include processing circuitry configured to determine a detected position at which a stylus contacts or hovers above the capacitive touch-sensitive surface. The processing circuitry may be further configured to determine, based at least in part on the detected position, a first electrode set and a second electrode set of the electrodes included in the array. The detected position may be located proximate to one or more first row electrodes and/or one or more first column electrodes included in the first electrode set. The second electrode set includes a plurality of second row electrodes and a plurality of second column electrodes not included in the first electrode set. The touch-sensitive device may further include a driving circuit configured to transmit a first driving signal to the first electrode set. The driving circuit may be further configured to transmit a second driving signal that differs from the first driving signal to the second electrode set.

According to this aspect, the first electrode set may include a plurality of adjacent first row electrodes within a first row range and a plurality of adjacent first column electrodes within a first column range.

According to this aspect, the detected position may be located proximate to a first intersection point between a first row of a first row electrode of the one or more first row electrodes included in the first electrode set and a first column of a first column electrode of the one or more first column electrodes included in the first electrode set.

According to this aspect, the first electrode set and the second electrode set may include equal numbers of electrodes.

According to this aspect, the first electrode set may include one or more first row electrodes without including one or more first column electrodes, or the first electrode set may include one or more first column electrodes without including one or more first row electrodes.

According to this aspect, the first driving signal may be a first pseudo-random noise signal and the second driving signal may be a second pseudo-random noise signal.

According to this aspect, the second driving signal may be opposite to the first driving signal.

According to this aspect, the second driving signal may be a zero-voltage signal.

According to this aspect, the processing circuitry may be configured to determine the detected position at least in part by interpolating between a plurality of capacitance measurements associated with a respective plurality of intersection points between the rows and the columns of the array.

According to this aspect, the first electrode set may include a plurality of adjacent first row electrodes within a first row range and a plurality of adjacent first column electrodes within a first column range. The processing circuitry may be further configured to determine, based at least in part on the plurality of capacitance measurements, that a charge distribution induced on the capacitive touch-sensitive surface by the stylus is skewed relative to the detected position. Based at least in part on the charge distribution, the processing circuitry may be further configured to select the first electrode set such that the detected position is off-center within at least one of the first row range and the first column range.

According to this aspect, the processing circuitry may be further configured to receive a stylus electrical signal from the stylus via the capacitive touch-sensitive surface. The processing circuitry may be further configured to determine the detected position based at least in part on the stylus electrical signal.

According to this aspect, the driving circuit may be configured to transmit the first driving signal and the second driving signal to the capacitive touch-sensitive surface during an uplink phase. The capacitive touch-sensitive surface may be configured to receive the stylus electrical signal during a downlink phase. The processing circuitry may be configured to loop through the uplink phase and the downlink phase.

According to this aspect, the processing circuitry may be further configured to compute a predicted position based at least in part on a plurality of prior detected positions. The processing circuitry may be further configured to select the first electrode set and the second electrode set based at least in part on the predicted position.

According to another aspect of the present disclosure, a method is provided for use with a touch-sensitive device including a capacitive touch-sensitive surface with an array of electrodes arranged in a plurality of rows and a plurality of columns. The method may include determining a detected position at which a stylus contacts or hovers above the capacitive touch-sensitive surface. The method may further include determining, based at least in part on the detected position, a first electrode set and a second electrode set of the electrodes included in the array. The detected position may be located proximate to one or more first row electrodes and/or one or more first column electrodes included in the first electrode set. The second electrode set may include a plurality of second row electrodes and a plurality of second column electrodes not included in the first electrode set. The method may further include transmitting a first driving signal to the first electrode set. The method may further include transmitting a second driving signal that differs from the first driving signal to the second electrode set.

According to this aspect, the first electrode set may include a plurality of adjacent first row electrodes within a first row range and a plurality of adjacent first column electrodes within a first column range.

According to this aspect, the first driving signal may be a first pseudo-random noise signal and the second driving signal is a second pseudo-random noise signal.

According to this aspect, the second driving signal may be a zero-voltage signal.

According to this aspect, the detected position may be determined at least in part by interpolating between a plurality of capacitance measurements associated with a respective plurality of intersection points between the rows and the columns of the array.

According to this aspect, the method may further include receiving a stylus electrical signal from the stylus via the capacitive touch-sensitive surface. The method may further include determining the detected position based at least in part on the stylus electrical signal.

According to another aspect of the present disclosure, a touch-sensitive device is provided, including a capacitive touch-sensitive surface. The capacitive touch-sensitive surface may include an array of electrodes arranged in a plurality of rows and a plurality of columns. The touch-sensitive device may further include processing circuitry configured to, during a downlink phase, receive a stylus electrical signal from the stylus via the capacitive touch-sensitive surface. Based at least in part on the stylus electrical signal, the processing circuitry may be further configured to determine a detected position at which a stylus contacts or hovers above the capacitive touch-sensitive surface. The processing circuitry may be further configured to determine, based at least in part on the detected position, a first electrode set and a second electrode set of the electrodes included in the array. The detected position may be located proximate to one or more respective rows of one or more first row electrodes included in the first electrode set and one or more respective columns of one or more first column electrodes included in the first electrode set. The second electrode set may include a plurality of second row electrodes and a plurality of second column electrodes not included in the first electrode set. The touch-sensitive device may further include a driving circuit configured to, during an uplink phase, transmit a first driving signal to the first electrode set. The driving circuit may be further configured to transmit a second driving signal that differs from the first driving signal to the second electrode set.

"And/or" as used herein is defined as the inclusive or ∨, as specified by the following truth table:

| A | B | A ∨ B |
|---|---|-------|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-sensitive device comprising:
a capacitive touch-sensitive surface including an array of electrodes arranged in a plurality of rows and a plurality of columns;
processing circuitry configured to:
determine a detected position at which a stylus contacts or hovers above the capacitive touch-sensitive surface at least in part by interpolating between a plurality of capacitance measurements associated with a respective plurality of intersection points between the rows and the columns of the array;
determine, based at least in part on the plurality of capacitance measurements, that a charge distribution induced on the capacitive touch-sensitive surface by the stylus is skewed relative to the detected position; and
determine, based at least in part on the detected position and the charge distribution, a first electrode set and a second electrode set of the electrodes included in the array, wherein:
the first electrode set includes a plurality of adjacent first row electrodes within a first row range and a plurality of adjacent first column electrodes within a first column range;
the detected position is a location within the charge distribution that is off-center within at least one of the first row range and the first column range and is located proximate to one or more of the plurality of adjacent first row electrodes and/or one or more of the plurality of adjacent first column electrodes included in the first electrode set; and the second electrode set includes a plurality of second row electrodes and a plurality of second column electrodes not included in the first electrode set; and a driving circuit configured to:
transmit a first driving signal to the first electrode set; and
transmit a second driving signal that differs from the first driving signal to the second electrode set.

2. The touch-sensitive device of claim 1, wherein the detected position is located proximate to a first intersection point between:
a first row of a first row electrode of the one or more first row electrodes included in the first electrode set; and
a first column of a first column electrode of the one or more first column electrodes included in the first electrode set.

3. The touch-sensitive device of claim 1, wherein the first electrode set and the second electrode set include equal numbers of electrodes.

4. The touch-sensitive device of claim 1, wherein:
the first electrode set includes one or more first row electrodes without including one or more first column electrodes; or
the first electrode set includes one or more first column electrodes without including one or more first row electrodes.

5. The touch-sensitive device of claim 1, wherein the first driving signal is a first pseudo-random noise signal and the second driving signal is a second pseudo-random noise signal.

6. The touch-sensitive device of claim 1, wherein the second driving signal is opposite to the first driving signal.

7. The touch-sensitive device of claim 1, wherein the second driving signal is a zero-voltage signal.

8. The touch-sensitive device of claim 1, wherein the processing circuitry is further configured to:
receive a stylus electrical signal from the stylus via the capacitive touch-sensitive surface; and
determine the detected position based at least in part on the stylus electrical signal.

9. The touch-sensitive device of claim 8, wherein:
the driving circuit is configured to transmit the first driving signal and the second driving signal to the capacitive touch-sensitive surface during an uplink phase;
the capacitive touch-sensitive surface is configured to receive the stylus electrical signal during a downlink phase; and
the processing circuitry is configured to loop through the uplink phase and the downlink phase.

10. The touch-sensitive device of claim 1, wherein the processing circuitry is further configured to:
compute a predicted position based at least in part on a plurality of prior detected positions; and
select the first electrode set and the second electrode set based at least in part on the predicted position.

11. A method for use with a touch-sensitive device including a capacitive touch-sensitive surface with an array of electrodes arranged in a plurality of rows and a plurality of columns, the method comprising:
determining a detected position at which a stylus contacts or hovers above the capacitive touch-sensitive surface at least in part by interpolating between a plurality of capacitance measurements associated with a respective plurality of intersection points between the rows and the columns of the array;

determining, based at least in part on the plurality of capacitance measurements, that a charge distribution induced on the capacitive touch-sensitive surface by the stylus is skewed relative to the detected position;
determining, based at least in part on the detected position and the charge distribution, a first electrode set and a second electrode set of the electrodes included in the array, wherein:
the first electrode set includes a plurality of adjacent first row electrodes within a first row range and a plurality of adjacent first column electrodes within a first column range;
the detected position is a location within the charge distribution that is off-center within at least one of the first row range and the first column range and is located proximate to one or more of the plurality of adjacent first row electrodes and/or one or more of the plurality of adjacent first column electrodes included in the first electrode set; and
the second electrode set includes a plurality of second row electrodes and a plurality of second column electrodes not included in the first electrode set;
transmitting a first driving signal to the first electrode set; and
transmitting a second driving signal that differs from the first driving signal to the second electrode set.

12. The method of claim 11, wherein the first driving signal is a first pseudo-random noise signal and the second driving signal is a second pseudo-random noise signal.

13. The method of claim 11, wherein the second driving signal is a zero-voltage signal.

14. The method of claim 11, further comprising:
receiving a stylus electrical signal from the stylus via the capacitive touch-sensitive surface; and
determining the detected position based at least in part on the stylus electrical signal.

15. A touch-sensitive device comprising:
a capacitive touch-sensitive surface including an array of electrodes arranged in a plurality of rows and a plurality of columns;
processing circuitry configured to:
during a downlink phase, receive a stylus electrical signal from the stylus via the capacitive touch-sensitive surface;
based at least in part on the stylus electrical signal, determine a detected position at which a stylus contacts or hovers above the capacitive touch-sensitive surface at least in part by interpolating between a plurality of capacitance measurements associated with a respective plurality of intersection points between the rows and the columns of the array;
determine, based at least in part on the plurality of capacitance measurements, that a charge distribution induced on the capacitive touch-sensitive surface by the stylus is skewed relative to the detected position; and
determine, based at least in part on the detected position and the charge distribution, a first electrode set and a second electrode set of the electrodes included in the array, wherein:
the first electrode set includes a plurality of adjacent first row electrodes within a first row range and a plurality of adjacent first column electrodes within a first column range;
the detected position is a location within the charge distribution that is off-center within at least one of the first row range and the first column range and is located proximate to one or more respective rows of one or more of the plurality of adjacent first row electrodes included in the first electrode set and one or more respective columns of one or more of the plurality of adjacent first column electrodes included in the first electrode set; and the second electrode set includes a plurality of second row electrodes and a plurality of second column electrodes not included in the first electrode set; and a driving circuit configured to, during an uplink phase:
transmit a first driving signal to the first electrode set; and
transmit a second driving signal that differs from the first driving signal to the second electrode set.

* * * * *